US012775557B1

(12) United States Patent
Wang et al.

(10) Patent No.: US 12,775,557 B1
(45) Date of Patent: Oct. 27, 2026

(54) GRANULAR CACHE MANAGEMENT

(71) Applicant: Cloudflare, Inc., San Francisco, CA (US)

(72) Inventors: Edward Wang, Oakland, CA (US); Kevin Guthrie, Marietta, GA (US); Matthew Gumport, Seattle, WA (US); Yuchen Wu, Las Vegas, NV (US)

(73) Assignee: Cloudflare, Inc., San Francisco, CA (US)

( * ) Notice: Subject to any disclaimer, the term of this patent is extended or adjusted under 35 U.S.C. 154(b) by 0 days.

(21) Appl. No.: 19/431,075

(22) Filed: Dec. 23, 2025

(51) Int. Cl.
*G06F 12/0871* (2016.01)

(52) U.S. Cl.
CPC ................................ *G06F 12/0871* (2013.01)

(58) Field of Classification Search
CPC ........................... G06F 12/0871; H04L 67/568
USPC .......................................................... 711/118
See application file for complete search history.

(56) References Cited

U.S. PATENT DOCUMENTS 6,199,107 B1 * 3/2001 Dujari ................. G06F 16/9574 709/219
2018/0160193 A1 * 6/2018 Yoo .................... H04N 21/6125
2019/0199766 A1 * 6/2019 Basile .............. H04N 21/23106
2020/0204841 A1 * 6/2020 Van Brandenburg ........................ H04N 21/6587

* cited by examiner

*Primary Examiner* — Jared I Rutz
*Assistant Examiner* — Wei Ma
(74) *Attorney, Agent, or Firm* — MLO, a professional corp.

(57) ABSTRACT

A method involves receiving, by a cache management module of a network, a first byte range of a data resource from a client device, the first byte range being of a first data segment size. The module determines that the first byte range is not stored at a network cache, identifies a second data segment size for data stored at the cache, computes a second byte range that is an integer multiple of the second data segment size and that includes the entirety of the first byte range, requests and receives the second byte range for the network data resource from a server and stores it at the cache in one or more data segments, each corresponding to the second data segment size, and sends third data from the cache to the client device, the third data corresponding to the first byte range and comprising data of the second data.

16 Claims, 7 Drawing Sheets

100

400

600

GRANULAR CACHE MANAGEMENT

BACKGROUND

HTTP Range requests enable a network client device (e.g., a laptop computer, a desktop computer, a tablet, a television, a mobile phone, etc.) to retrieve only a specified portion of a network data resource (e.g., a file, a data object, etc.) from a server, rather than the entire underlying resource. This mechanism is widely used by various types of clients, including media players that support random access to audio or video streams, data analysis tools that require only a subset of a large file, and download managers that allow users to pause and resume downloads efficiently.

To further improve performance and scalability, caching is often employed in conjunction with data range requests. When correctly deployed, caching is an effective method for accelerating web content delivery. By placing content closer to the end user, caching reduces latency and minimizes the number of requests that must be forwarded to the upstream origin server.

One approach to supporting range requests with caching is a "cache-slice" method. In this method, a proxy or intermediary server divides large files into smaller data segments, or "slices", and retrieves each segment from the origin server only when it is needed. These segments are then stored in the cache. When a client device requests a particular range of a network data resource, the server delivers the appropriate portions of one or more cached segments to fulfill the request. If a client device requests a large byte range or the entire file, the server issues sub-requests for each required segment, independently caching them as they are received from the origin. Once all necessary segments are cached, the server assembles the complete response from the cached segments and delivers it to the client.

SUMMARY

In some aspects, the techniques described herein relate to a method, including: receiving, by a cache management module at a compute node of a network, a first requested byte range of a network data resource from a first client device of the network, the first requested byte range being of a first data segment size; determining, by the cache management module, that first data corresponding to the first requested byte range of the network data resource is not stored at a cache storage module of the network; identifying, by the cache management module, a second data segment size for data stored at the cache storage module; computing, by the cache management module, a second requested byte range of the network data resource that is an integer multiple of the second data segment size and that includes the entirety of the first requested byte range; requesting, by the cache management module, the second requested byte range for the network data resource from a server of the network; receiving, by the cache management module, second data from the server corresponding to the second requested byte range; storing, by the cache management module, the second data at the cache storage module in one or more data segments at the cache storage module, each of the one or more data segments corresponding to the second data segment size; and sending, by the cache management module, third data from the cache storage module to the first client device, the third data corresponding to the first requested byte range and comprising data of the second data.

In some aspects, the techniques described herein relate to a non-transitory computer-readable medium storing instructions for executing a computer-implemented method, the computer-implemented method including: receiving, by a cache management module at a compute node of a network, a first requested byte range of a network data resource from a first client device of the network, the first requested byte range being of a first data segment size; determining, by the cache management module, that first data corresponding to the first requested byte range of the network data resource is not stored at a cache storage module of the network; identifying, by the cache management module, a second data segment size for data stored at the cache storage module; computing, by the cache management module, a second requested byte range of the network data resource that is an integer multiple of the second data segment size and that includes the entirety of the first requested byte range; requesting, by the cache management module, the second requested byte range for the network data resource from a server of the network; receiving, by the cache management module, second data from the server corresponding to the second requested byte range; storing, by the cache management module, the second data at the cache storage module in one or more data segments at the cache storage module, each of the one or more data segments corresponding to the second data segment size; and sending, by the cache management module, third data from the cache storage module to the first client device, the third data corresponding to the first requested byte range and comprising data of the second data.

DETAILED DESCRIPTION

Figure 1:
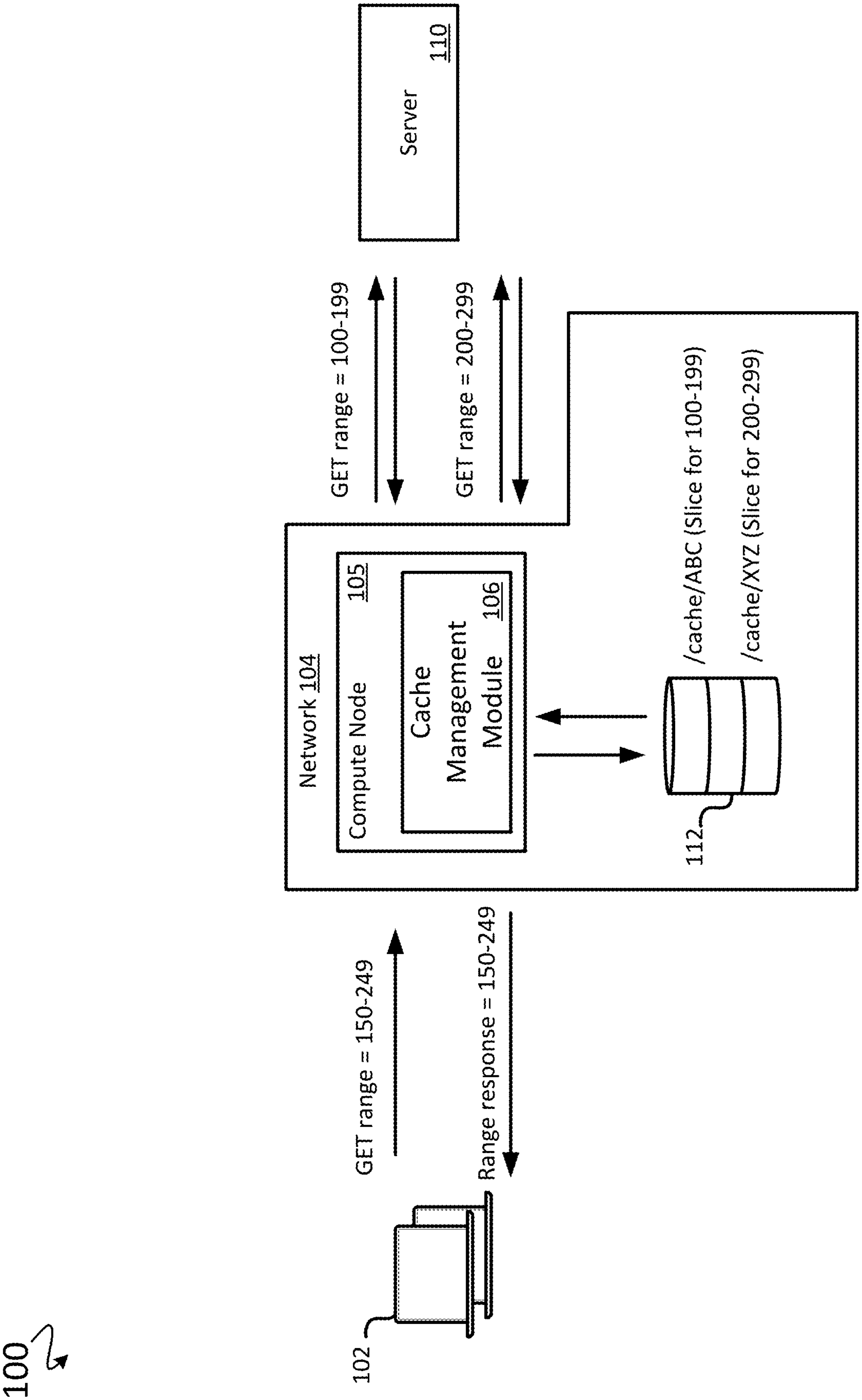
FIG. 1 illustrates an example of an operational environment for serving HTTP range requests within a network.

FIG. 1 illustrates an example of an operational environment 100 for serving HTTP range requests within a network 104. The environment 100 includes client devices 102 (e.g., desktop computers, televisions, laptop computers, tablets, mobile phones, etc.), an origin server 110 (e.g., of a content delivery network), and a network 104 which includes a conventional cache management module 106 instantiated at a compute node 105 (e.g., a server) and a cache storage module 112, among other elements, not shown.

In some examples, the network 104 exposes distributed IP endpoints, each being an IP address that is concurrently advertised or made available by multiple network nodes, such that a given flow directed to the IP address may be routed to any one of the participating nodes based on network topology, routing policy, or path selection criteria. Each distributed IP endpoint thus represents a logical destination that may resolve dynamically to different physical or virtual nodes over time, while remaining constant from the perspective of the originating network. In other examples, the network 104 is a conventional computer network that does not provide distributed IP endpoints.

In operation, a client device 102 initiates a request for a specific byte range of a network data resource (e.g., a data file, and executable program, a movie file, a music file, a video game file or executable, etc.) by issuing an HTTP GET request specifying a range offset (e.g., bytes 150-249). The network 104 receives the range request and, via the cache management module 106, determines which segments (or "slices") of the resource are required to fulfill the client's request (e.g., bytes 100-199 and bytes 200-299 for a user-configured 100-byte segment size).

If the required segments are not already present in the cache storage module 112, the cache management module 106 issues one or more HTTP range requests to the origin server 110 to retrieve the necessary segments (e.g., bytes 100-199 and 200-299). If the origin server 110 does not support range requests, the cache management module 106 may retrieve the entire network data resource from the server 110 and cache the resource data as independent segments in the cache storage module 112 as the data is received. Each segment retrieved from the origin server 110 is stored separately in the cache storage module 112, thereby enabling future requests for overlapping or adjacent ranges of the same alignment to be satisfied directly from the cache. In such examples, each segment stored in the cache storage module 112 has an associated cache key that includes the URL of the network data resource and metadata indicating the segment's boundaries, which correspond to a user-configurable segment size.

Once the necessary segments are available, the cache management module 106 assembles multiple data regions and sub-regions, or extracts data subregions for the requested byte range from the cached segments, and returns the assembled range response to the requesting client device 102. In the example shown, the cache management module 106 has retrieved byte ranges 100-199 and 200-299 from the origin server 110. From those two ranges, the cache management module extracts and returns the byte range of 150-249. However, since the cache data segment size is stored as part of a given cache key, if a user (e.g., an administrator of an organization, website, or application owner that receives services from the network 104) changes a configured segment size or alignment within the cache storage module 112 that differs from what is already present in cache storage module 112, the previously cached segments can no longer be used to satisfy client device range requests. In such instances, the cache management module 106 must retrieve the newly requested segment from the origin server 110 to satisfy client device requests in accordance with the newly specified segment size and alignment. As a result, the benefits of caching, such as reduced latency and minimized origin server load, may be diminished.

In addition to segment request/cache size mismatches, users may sometimes configure the cache management module 106 to retrieve and store a non-optimal (e.g., too small, or too large) segment size. In such scenarios, several inefficiencies may arise within the caching and delivery system. For example, if a "too small" segment size is used, the cache management module 106 must process a greater number of individual requests to retrieve the same amount of data, resulting in increased protocol overhead and higher latency for the client device 102 as well as increased traffic to the origin server 110. As a result, the origin server 110 and cache management module 106 are required to handle a larger volume of transactions, which can lead to elevated resource consumption and reduced throughput.

Additionally, the storage of numerous small segments can fragment the cache storage module 112, thereby complicating cache management and potentially reducing the cache hit rate for subsequent requests. As such, the increased number of small segments may also strain cache indexing mechanisms.

Yet another issue arises when the cache management module 106 receives concurrent requests from respective client devices 102 for the same segment which block each other using a cache lock mechanism. For example, if a first client device requests bytes 0-100 of a particular network data resource, and a second client device requests bytes 900-1,023 of the same network data resource, the second request is blocked until the first client device's request has been satisfied.

In addition to the issues mentioned above, conventional cache management modules may treat each cached segment as an independent data object with no association to other cached segments for the same network data resource, resulting in cache "churning". Cache churning involves the rapid addition and eviction of cached segments. For example, though a large media file could be comprised of hundreds or thousands of segments, each segment may be stored in the cache storage module 112 with no association to other segments of that media file beyond conventional locality. In scenarios in which the media file is being downloaded by many client devices simultaneously, the cache management module 106 may continually populate the cache storage module 112 with first segments of the media file and then evict those same segments to fit second segment for that media file, even though many other client devices may be requesting the first segments.

Disclosed herein are granular cache management methods and systems that optimize cache performance as compared to conventional solutions by decoupling client-side requested ranges from cached segment sizes, associating cached segments by network data resource, providing granular cache locks for requested data ranges, as well as other improvements disclosed below. As such, HTTP range requests may be efficiently cached with minimal bandwidth amplification and reduced latency as compared to conventional solutions.

Figure 2:
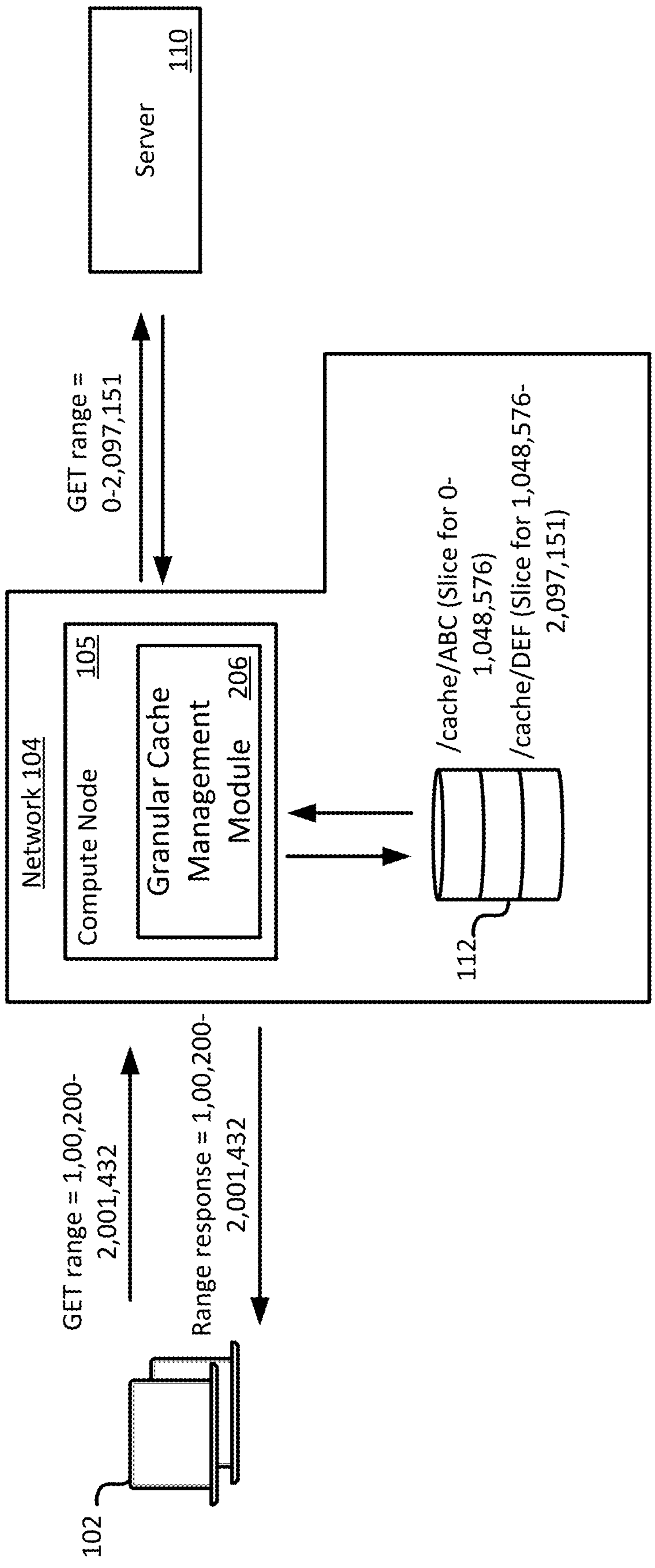
FIG. 2 shows a high-level example of a granular cache management module within the operational environment introduced in FIG. 1, in accordance with some examples.

FIG. 2 shows a high-level example of a granular cache management module 206 that is instantiated at the compute node 105 within the network 104 of the operational environment 100, introduced in FIG. 1, in accordance with some examples. In the example shown, the granular cache management module 206 is advantageously configured by a user of the network 104 to receive client range requests of arbitrary sizes, but internally generates fixed size cache segments (e.g., 512 Bytes, 1 MiB, 2 MiB, or another fixed amount) at the cache storage module 112 and is operable to perform range requests to the origin server 110 using yet other data segment sizes (e.g., integer multiples of the fixed size cache segments). As such, the granular cache management module 206 decouples data range request sizes between those issued to the cache management module 206 from a client device 102, those issued from the granular cache management module 206 to the origin server 110, and those stored in the cache storage module 112 as data segments by the granular cache management module 206.

In the example shown, a client device 102 has requested an HTTP range request corresponding to a first data segment size having a byte range of 1,00,200-2,001,432 bytes. The granular cache module 206 stores data in the cache data storage module 112 in accordance with a second data segment size of 1 MiB per segment. As such, the granular cache management module 206 requests a data range from the origin server 110 corresponding to a third data segment size that is an integer multiple of the second data segment size and chunks the retrieved data in the cache data storage module 112 in accordance with the second data segment size (i.e., the retrieved data is broken into 1 MiB segments).

By decoupling client range request sizes from the cached segment size and those which are ultimately requested of the origin server 110, the granular cache management module 206 advantageously issues as few requests as possible to the origin server 110 to serve a client device range request. For example, a user may have configured the conventional cache management module 106 of FIG. 1 to retrieve and store 100 byte segments in the cache storage module 112. As such, a range request for bytes 150-350 of a network data resource that is not yet cached would cause the conventional cache management module to request data ranges 100-200, 200-300, and 300-400 from the origin server 110 in three separate requests. By comparison, the granular cache management module 206 may advantageously issue a single request (e.g., 0-1,048,575) corresponding to an integer multiple of the cache storage module segment size from the origin server 110.

Additionally, in conventional caching systems, cache keys serve as unique identifiers generated for each stored data segment, thereby enabling the cache to efficiently determine whether a requested network data resource is already available. A given cache key is typically derived from attributes of the client's request, such as the resource's URL, segment size, and selected HTTP headers. For some conventional cache management modules that make use of user-configurable cache segment sizes, the cache key may also include the cached segment size/boundaries. By constructing the cache key from these elements, the caching system ensures that only responses corresponding to identical requests are reused.

When a new request is received, the cache management module computes the corresponding cache key and checks for a matching entry in the cache. If a match is found (i.e., a cache "hit"), the cached response is returned directly to the client device. If no match is found (i.e., a cache "miss"), the request is forwarded to the origin server, and the resulting response is stored under the newly generated cache key for future use. However, as mentioned above, in conventional solutions which store cached segments independently of one another, multiple concurrent client device requests for a popular resource may cause cache churning.

To mitigate the issues mentioned above, the granular cache management module 206 advantageously associates (e.g., via entries in a data object) fixed-size cached segments belonging to the same network data resource together to reduce cache churning. In such examples, a fully cached file within the cache storage module 112 that has been requested via client device HTTP range requests will be equivalent in cache storage to the same file as if it had been downloaded to the cache storage module 112 all at once and then split into segment-sized chunks. Client device requests for the entire network data resource, as well as byte ranges of the resource, are advantageously mapped to the same cached entries. Requests for the entire resource are served from the cache storage module 112, with the granular cache management module 206 retrieving any missing segments from the origin server 110 in the background. Conversely, HTTP range requests for the network data resource from client devices are mapped to offsets into the underlying cached resource by the granular cache management module 206, thereby retrieving such requests from the same cache entry in the cache storage module 112.

To further reduce latency for client device HTTP range requests, the granular cache management module 206 advantageously generates sub-segment, "granular", cache locks for individual byte ranges of cached resources. As such, for a given cached entry having a 1 MiB segment size, a first client device request for bytes 0-100 of a cached segment will not block a second client device's request for bytes 800-900 of the cached segment, thereby reducing latency as compared to conventional solutions.

Figure 3:
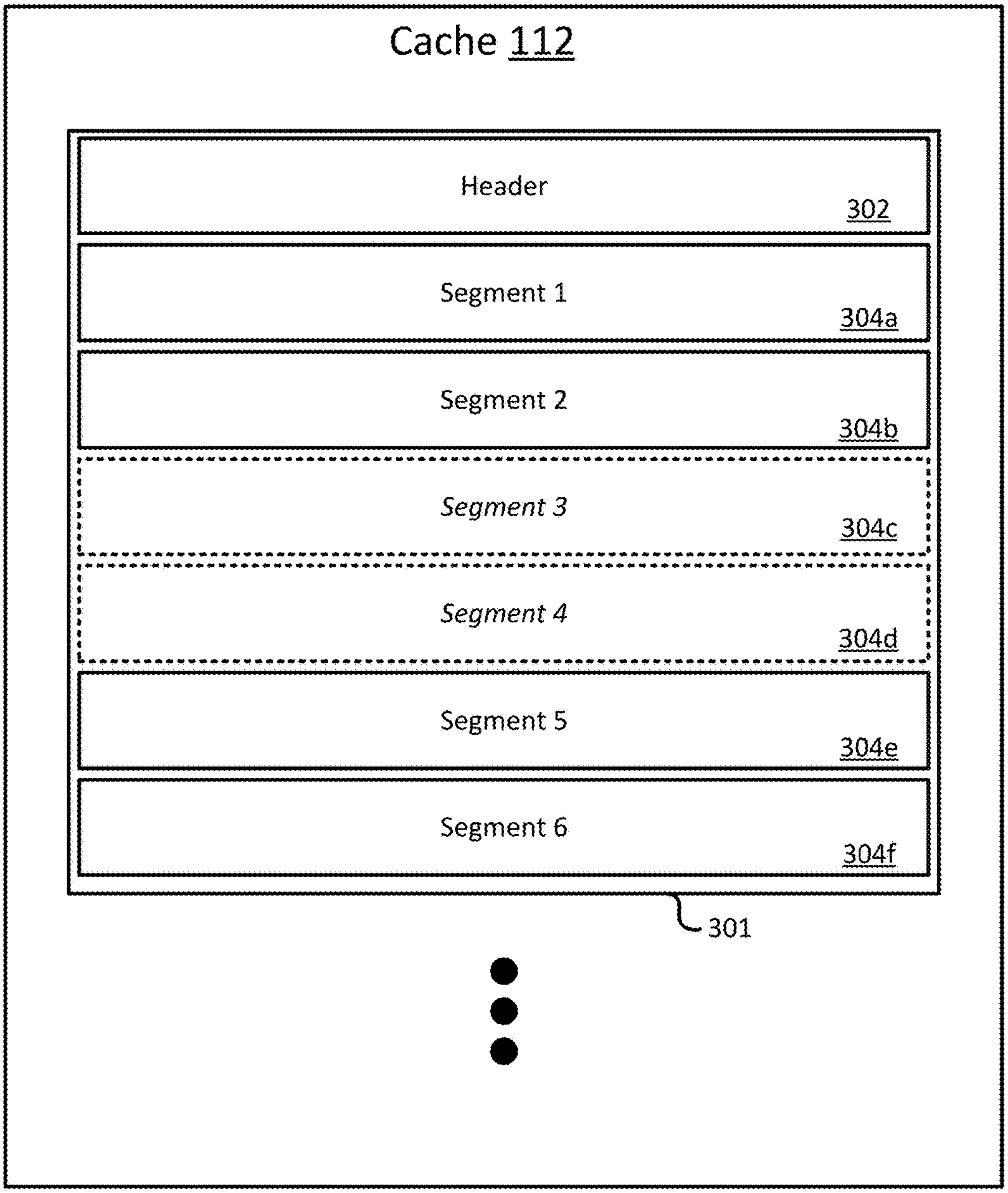
FIG. 3 shows a set of cache entries of a network data resource stored by the granular cache management module, in accordance with some examples.

As a simplified example, FIG. 3 shows a set of cached entries 301 in the cache storage module 112 stored by the granular cache management module 206, in accordance with some examples. In the example shown, a header 302 (e.g., a data object) is associated with a network data resource (e.g., a file) that comprises six segments in its entirety. In some examples, the header 302 identifies the network data resource, and identifies which fixed-size data segments of the network data resource have been cached. By enforcing fixed, non-user-configurable, data segment sizes, the granular cache management module 206 advantageously reduces fragmentation in the cache storage module 112 as compared to conventional solutions.

In the example shown, segments 304*a-b* and 304*e-f* have previously been requested by client devices 102 (not shown), and the granular cache management module 206 (not shown) has cached those segments in the cache storage module 112. If a client device were to send an HTTP range request for the entire network data resource, the granular cache management module 206 would determine a cache hit or miss for the cached segments of the network data resource based on the header 302. Similarly, if a client device were to send an HTTP range request for individual segments of the network data resource, the granular cache management module 206 would also determine a cache hit or miss based on the header 302.

In the example shown, if an HTTP range request includes data within any of the segments 304*a-b*, the granular cache management module 206 is able to provide the requested data directly from the cache storage module. However, if a client device requests the entire network data resource, or a range of data that spans any of segments 304*c* and/or 304*d*, the granular cache management module 206 must pull the respective data corresponding to those segments from the origin server 110 and create the associated entries at the cache storage module 112.

As disclosed above, when HTTP range requests are received from a client device, rather than treating each of the segments 304*a-f* as independent data objects, the granular cache management module 206 maps the received range requests into offsets into the cached entries 301, accounting for an offset from the header 302. That is, a cache hit for segments 304*e-f* is identified based on the header 302, and segments 304*e-f* are retrieved using offsets relative to the header 302. In other examples, the header 302 specifies where one or more of the segments 304*a-f* begins, and thus an offset from the header 302 is not required.

Figure 4:
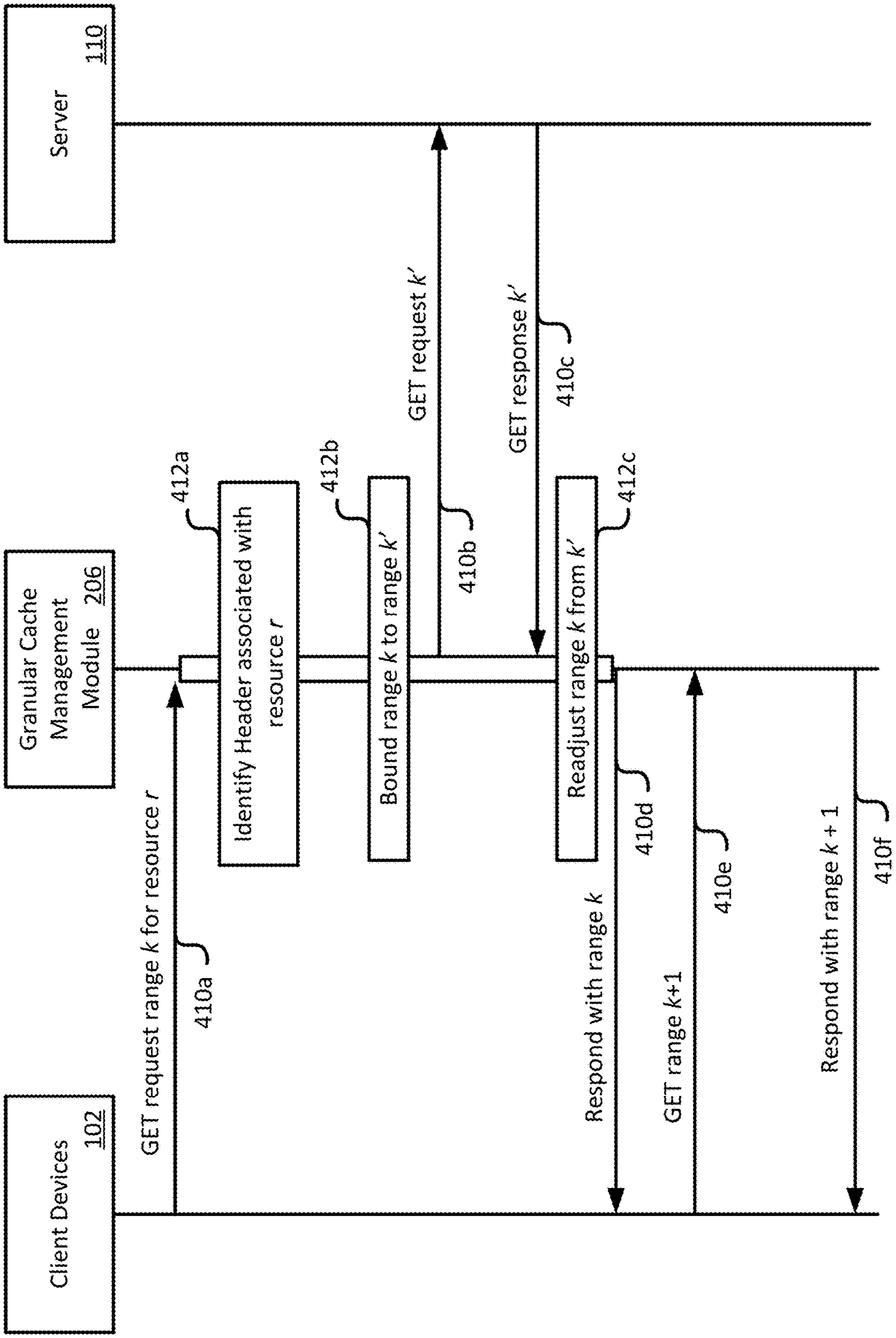
FIG. 4 illustrates a simplified sequence for retrieving missing data segments from the origin server for a cached network data resource, in accordance with some examples.

FIG. 4 illustrates a sequence 400 for retrieving missing segments from the origin server 110 for a cached network data resource, in accordance with some examples. As disclosed above with reference to FIG. 3, a client device 102 may request a range of data for a network data resource r (e.g., a file, data object, etc.) that is served from an origin server 110, and the granular cache management module 206 maps such requests to offsets within a cached version of the underlying resource. In the sequence 400, at 410*a*, a client device 102 requests an HTTP data range k (e.g., a first data segment size) of the network data resource r from the network 104 (not shown) which routes the request to the granular cache management module 206.

As described above, data for a given cached network data resource is stored in the cache storage module in respective chunks corresponding to a fixed data segment size (e.g., a second data segment size). At 412*a*, the granular cache management module 206 identifies a header data object stored in the cache storage module 112 that is associated with the network data resource r and any cached data segments thereof. In some examples, the header data object identifies the network data resource r and catalogues which, if any, data ranges of the network resource r have already been stored in the cache storage module 112. At 412*b*, the granular cache management module 206 bounds the requested data range k for the network data resource r to a bounded range k' (described in detail below). In some examples, computing the bounded range k' includes using the data size of the identified header when determining where the requested byte range begins. In some examples, bounding the data range k involves rounding both extents of the data range k to an integer multiple of the cache storage module segment size, and aligning a data offset such that a fully cached network data resource would correspond to the network data resource if it had been copied to the cache storage as a single file.

As introduced above, the bounded range k' may specify the exact position in the requested network data resource that the requested bounded data range k' begins, and additionally specifies the length, or ending point, of the data range to be retrieved. For example, if the cache storage module 112 stores fixed-sized entries of 1 MiB segments (i.e., 1,048,576 bytes), aligned to 1 MiB boundaries, segment 304*a* (shown in FIG. 3) may span 0-1,048,575 bytes (after the header 302), segment 304*b* may span 1,048,576-2,097,151 bytes, and segment 304*c* may span 2,097,152-3,145,727 bytes. If the client device 102 had requested a data range k of 2,101,000-3,002,000 bytes of the network data resource r at 410*a*, the granular cache management module 206 would determine that this data range falls within segment 304*c* (not yet cached), and then request, at 410*b*, a 1 MiB data range k' from the origin server that is bounded by bytes 2,097,152 through 3,145,727 of the segment 304*c* (e.g., a third data segment size). As such, the segment retrieved from the origin server 110 and stored in the cache storage module 112 at 410*c* exactly matches the segment boundaries used by the cache storage module 112.

At 412*c*, the granular cache management module 206 readjusts the retrieved and stored data (e.g., extracts a sub-section and/or assembles data from multiple segments) to generate the data range k from k', and responds to the client device 102 at 410*d* with the requested data range k. For example, if the data range k is 2,101,000-3,002,000 as described above, the data range k would be extracted from the bounded range k' of bytes 2,097,152 through 3,145,727 of the stored segment 304*c*.

By comparison, at step 410*e*, the client device 102 requests an HTTP range k+1 that is already cached by the granular cache management module 206 within the cache storage module 112 (e.g., such as the segment 304*e* shown in FIG. 3). As such, at 410*f*, the granular cache management module 206 may respond with the data of range k+1 without needing to retrieve the data from the origin server 110. The sequence 400 may then continue for subsequent data range requests beyond k+1.

In scenarios in which the origin server 110 does not support HTTP range requests, the granular cache management module 206 is operable to retrieve the network data resource from the origin server 110 in its entirety and cache the network data resource in the cache storage module 112 as a single response, chunked in fixed-sized segments, and associate a header with the network data resource and the associated fixed-size segments. Because the granular cache management module 206 maps client device range requests as offsets into the underlying file, the granular cache management module 206 may thereafter advantageously respond to client device range requests using cached segments.

As disclosed above, the granular cache module 206 is advantageously operable to issue granular, sub-segment, cache write/read locks for individual byte ranges of the cached data so as not to block client devices that are reading non-overlapping byte ranges. In some examples, the byte-range cache write/read locks may be implemented using an interval tree. As understood in the art, an interval tree is a data structure designed to store and manage intervals, each defined by a start and end point. The data structure enables efficient querying for overlaps between intervals in logarithmic time. In some examples, each cache lock may be stored in an interval tree as an interval (e.g., a starting position within the cached resource and an end offset) and then quickly checked if a new cache lock request overlaps with an existing lock interval.

Figure 5:
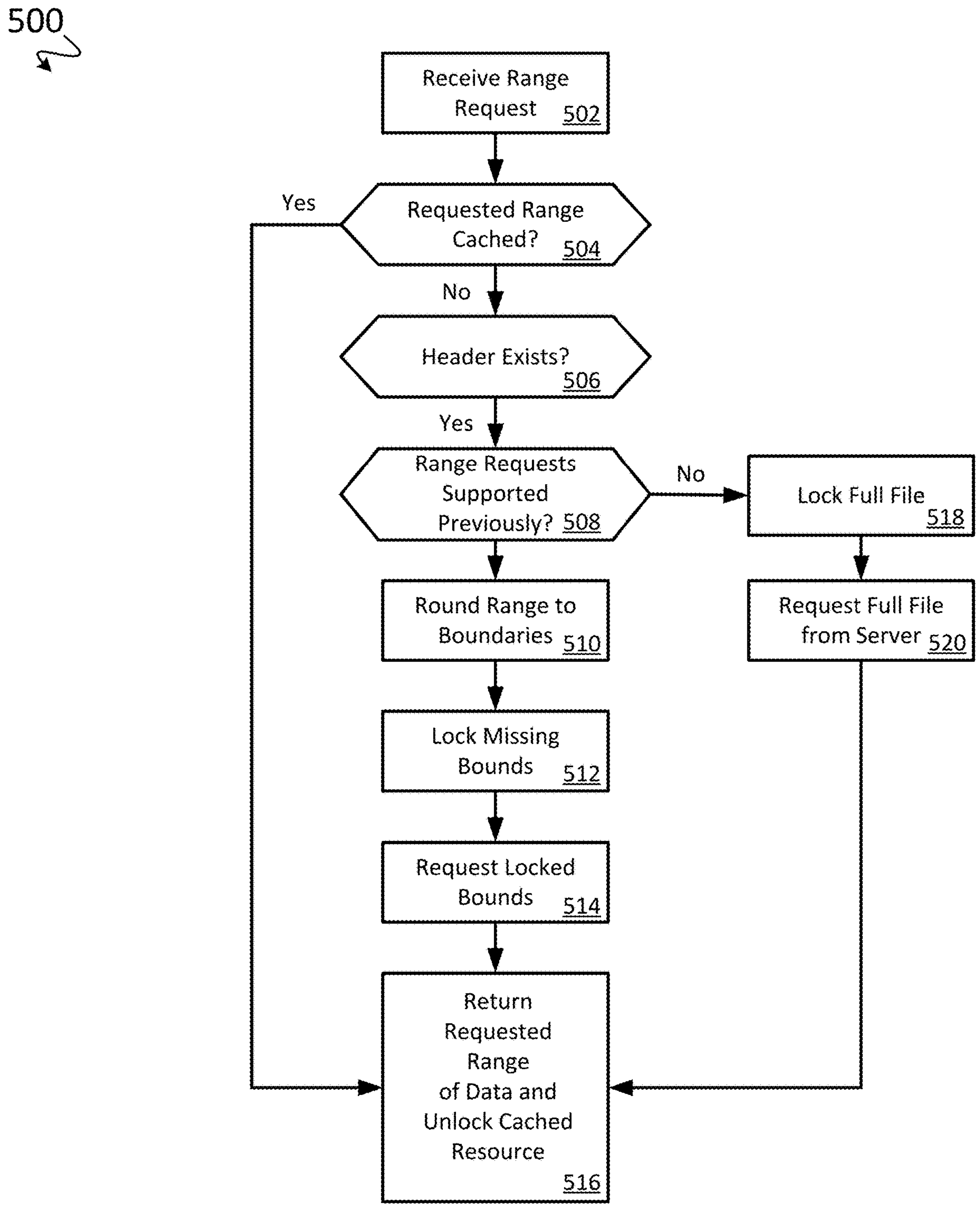
FIG. 5 provides a simplified portion of a process for granular cache management, in accordance with some examples.

At a high level, FIG. 5 provides a simplified portion of a process 500 for granular cache management, in accordance with some examples. At step 502, an HTTP range request for a network data resource is received (e.g., from a client device 102) at the network 104 and routed to the granular cache management module 206. The granular cache management module 206 then determines, at step 504, if a segment, or segments, overlapping the requested data range is/are already cached at the cache storage module 112. If an overlapping segment or segments is/are already cached, flow continues to step 516. At step 516, the granular cache management module 206 returns the requested range of data to the client device using the cached data segments.

If instead it was determined by the granular cache management module 206 at step 504 that the requested range of data is not cached, flow of the process continues to step 506. At step 506, the granular cache management module 206 determines if a header already exists in the cache storage module 112 that corresponds to the network data resource. In some scenarios, the header may be present in the cache storage module because one or more segments for the resource have already been cached by the granular cache management module 206, but the specific segments corresponding to requested data range have not been cached yet. In other scenarios, only the resource header may have been previously cached, or perhaps all, or a portion, of the network data resource has been evicted from the cache storage module 112. Regardless, if a header exists, flow continues to step 508, whereupon the granular cache control module 206 determines if the origin server 110 supported range requests during previous requests (e.g., based on stored metadata within the cache storage module 112).

If it was determined at step 508 that the origin server 110 previously supported HTTP range requests, flow continues to step 510. As described above with reference to FIG. 4, at step 510, the granular cache management module 206 bounds the lower and upper values of the HTTP range request for the requested data to ranges matching those of the fixed segment size that will be stored in the cache storage module 112. For example, if fixed segments sizes of 1 MiB are used by the granular cache management module 206, the data range request will be rounded on either end to integer multiples of 1 MiB.

At step 512, the granular cache management module 206 asserts byte-range cache locks and adds cache lock interval tree entries for the byte ranges corresponding to the bounded data range that is to be retrieved from the origin server, and at step 514, requests a data range from the origin server 110 corresponding to the bounded data range. If subsequent client device requests are received for the locked data range while the granular cache management module 206 is retrieving and caching the data range from the origin server 110, the granular cache management module 206 advantageously blocks those subsequent requests until the cache lock is released rather than forwarding the requests to the origin server. As such, requests to the origin server 110 are reduced in exchange for a minimal increase in latency to the requesting client devices.

Upon receiving and caching the received bounded data from the origin server, the granular cache management module 206 returns, at step 516, the requested range of data to the requesting client device, unlocks the associated locked byte-ranges, and updates the cache lock interval tree.

If the granular cache management module 206 had determined, at step 508, that the origin server 110 did not previously support data range requests, at step 518, the granular cache management module 206 asserts a cache lock and updates the cache lock interval tree for the entire file (e.g., rather than granularly locking the byte ranges corresponding to the bounded data range). The granular cache management module 206 then requests, at 520, the full network data resource (e.g., a file) from the origin server 110. As described above, the granular cache management module caches the full network data resource in chunks corresponding to the fixed segment size that the granular cache management module 206 has configured. At step 516, the granular cache management module 206 returns the requested range of data to the requesting client device and unlocks (de-asserts) the previously locked segments and updates the cache lock interval tree.

Figure 6:
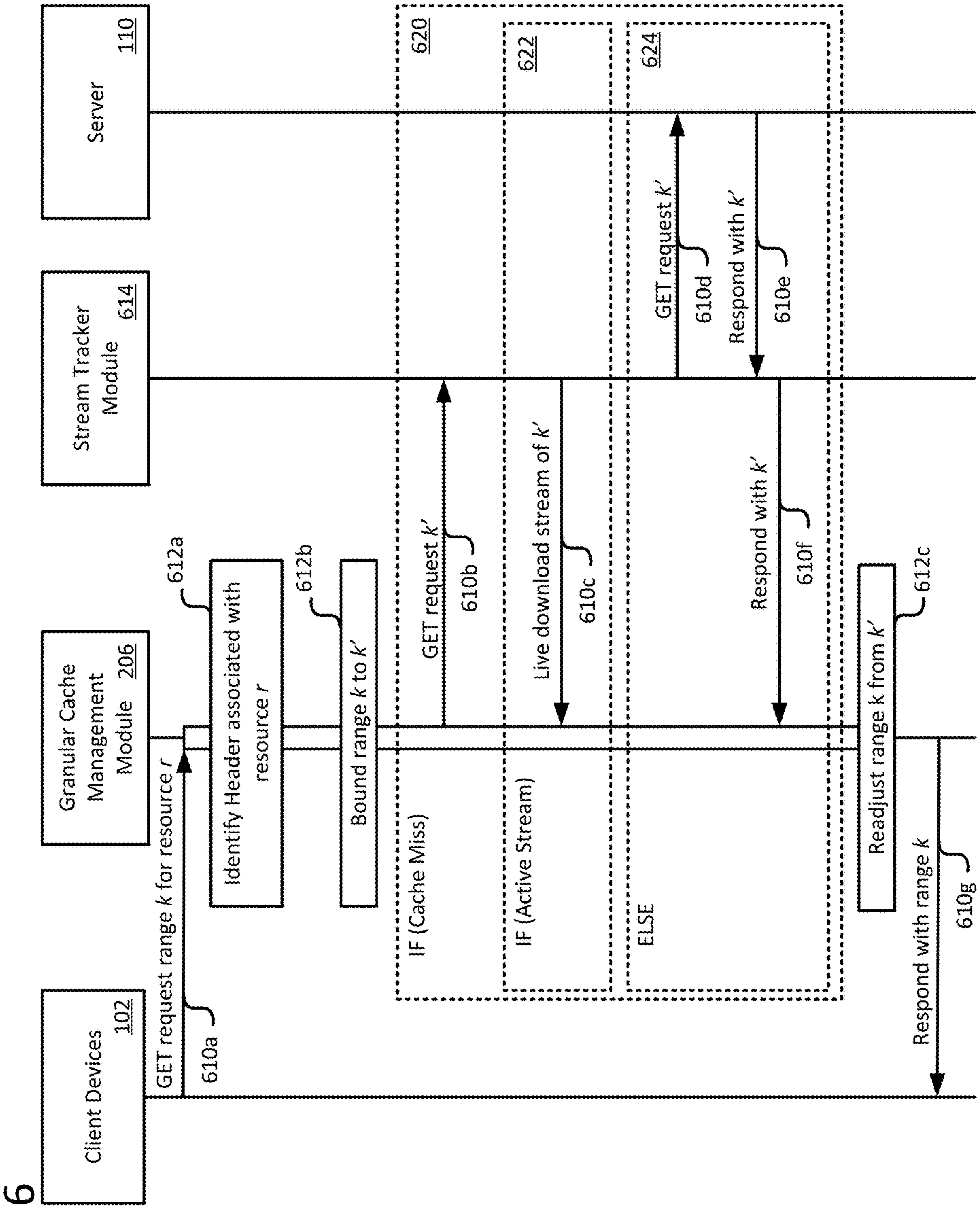
FIG. 6 illustrates a simplified sequence for using stream monitoring when retrieving missing segments from the origin server for a cached network data resource, in accordance with some examples.

In some examples, the granular cache management module 206 is advantageously operable to identify an ongoing download stream from the origin server and receive the ongoing stream to cache requested segments. FIG. 6 illustrates a sequence 600 for using stream monitoring when retrieving missing segments from the origin server 110 for a cached network data resource, in accordance with some examples.

At 610*a*, a client device 102 requests an HTTP data range k of the network data resource r from the network 104 (not shown) which routes the request to the granular cache management module 206.

At 612*a*, the granular cache management module 206 identifies a header data object stored in the cache storage module 112 that is associated with the network data resource r. At 612*b*, the granular cache management module 206 bounds the requested data range k for the network data resource to a bounded range k' such that the initially requested data range is rounded to an integer multiple of the cache storage module segment size at either extent and such that a fully cached network data resource would correspond to the network data resource if it had been copied to the cache storage as a single file. As described above, the bounded range k' specifies the position and extent in the requested network data resource r that the bounded data range begins, and additionally specifies the length, or ending point, of the data range to be retrieved, each rounded to the fixed segment size boundaries used by the cache storage module 112 (not shown).

In a conditional block 620, the granular cache management module 206 has determined that the requested data range is not stored in the cache storage module 112 (i.e., a cache miss). As such, at 610*b*, the granular cache management module 206 requests the bounded range k' from a stream tracker module 614. The stream tracker module 614 is a software module instantiated at a compute node of the distributed network 104 and is operable to determine if a given network data resource is being streamed into the cache storage module 112 from the origin server 110. In a conditional block 622, the stream tracker module 614 determines that the network data resource r is currently being streamed into the cache storage module 112 from the origin server 110 (i.e., there is an active stream) and advantageously transmits, at 610*c*, the requested data range corresponding to the bounded range k' from the ongoing data stream to the granular cache management module 206. At 612*c*, the granular cache management module 206 readjusts/extracts/assembles the data range k from the data corresponding to the bounded range k', and responds, at 610*g*, to the client device 102 with the requested range k at 610*g*.

In an alternative conditional block 624, the stream tracker module 614 determines that there is not an active stream for the network data resource r and therefore requests the data corresponding to the bounded range k' from the origin server 110 at 610*d*, and receives the requested data at 610*e*. The stream tracker module 614 thereafter sends the requested data corresponding to the bounded range k' to the granular cache management module 206 at 610*f*, which then readjusts/extracts/assembles the received data for the range k (e.g., selecting a subset of the received data, corresponding to the range k). The granular cache management module 206 then sends the requested data range k to the client device 102 at 610*g*. The sequence 600 may then continue for subsequent data range requests k+1.

Figure 7:
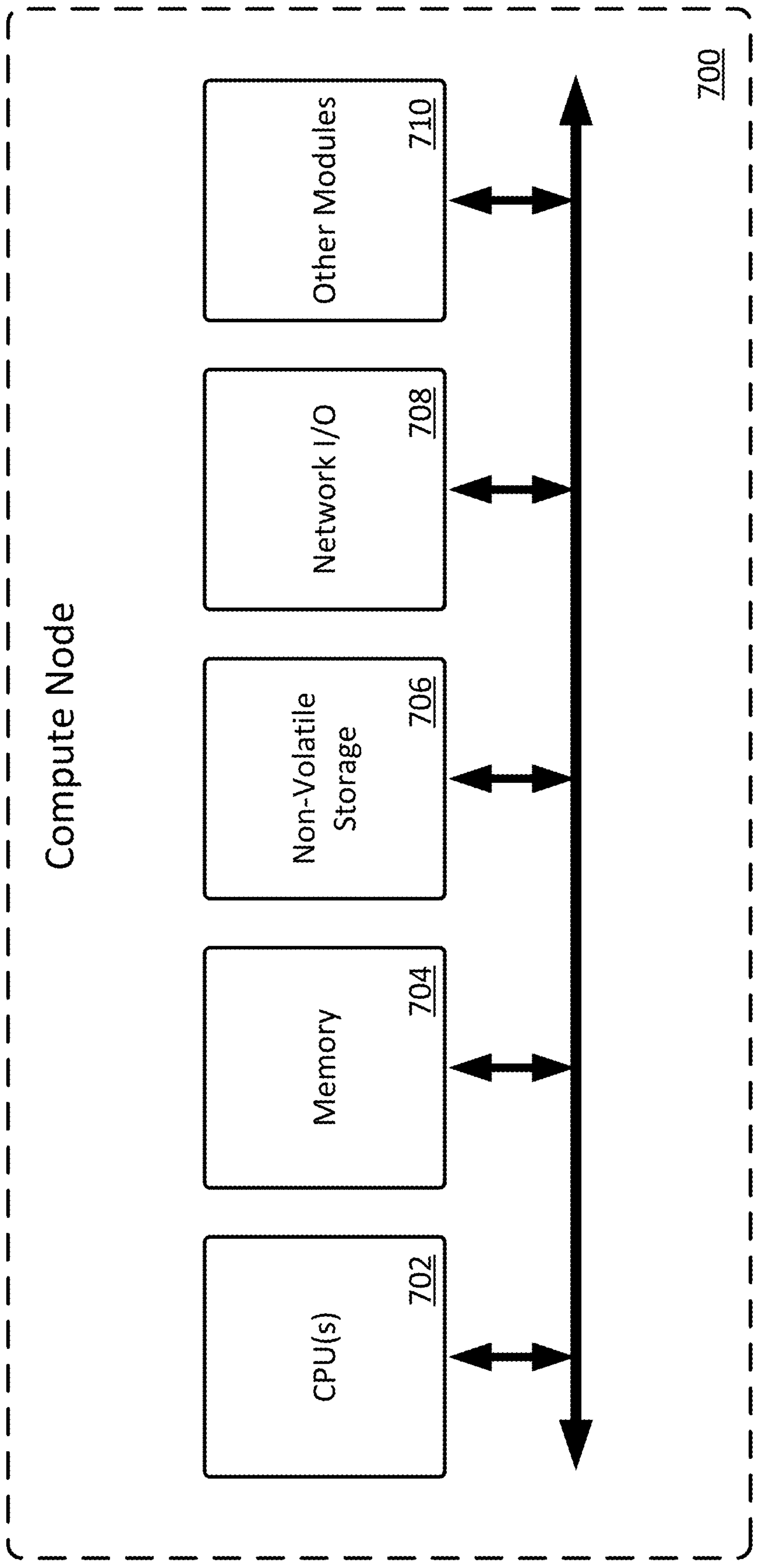
FIG. 7 illustrates an example of a compute node, in accordance with some examples.

FIG. 7 illustrates an example of a compute node 700, in accordance with some examples. In some examples, the compute node 105 is the same as or similar to the compute node 700. The compute node 700 is operable to store and perform all of the steps of the sequence 400, the process 500, and the sequence 600 disclosed herein and to access or store the associated data objects. The compute node 700 generally includes one or more CPUs 702, a memory module 704 (e.g., RAM), a non-volatile data storage module 706 (e.g., a hard drive or array of hard drives), a network I/O module 708 (e.g., a network interface card (NIC) and/or a top-of-rack interface), and other modules 710 such as user I/O, wireless communication modules, optical communication modules, system diagnostic or monitoring modules, or other modules. In some embodiments, the compute node 700 is configured to perform all or a portion of the process steps discussed with reference to the processes disclosed herein. The non-volatile data storage module 706 stores data and several programs for some or all of the above-described functions and process steps, among others. In some aspects, a non-transitory computer-readable medium (e.g., the non-volatile data storage module 706) stores instructions that, when executed by one or more processors, cause the processors to perform the method described above. The data and programs are loaded into the memory module 704, so that the one or more CPUs 702 (in conjunction with the memory module 704) can perform some or all of the above-described functions and process steps, among others. In some embodiments, the CPUs 702 are shared or dedicated CPUs. These CPUs may perform a single network function, perform multiple network functions, or perform other tasks in addition to performing network functions. Examples of the CPUs 702 include microprocessors, digital signal processors, microcontrollers, and dedicated hardware such as ASICs (Application Specific Integrated Circuits) and FPGAs (Field Programmable Gate Arrays).

Reference has been made in detail to aspects of the disclosed invention, one or more examples of which have been illustrated in the accompanying figures. Each example has been provided by way of explanation of the present technology, not as a limitation of the present technology. In fact, while the specification has been described in detail with respect to specific aspects of the invention, it will be appreciated that those skilled in the art, upon attaining an understanding of the foregoing, may readily conceive of alterations to, variations of, and equivalents to these aspects. For instance, features illustrated or described as part of one aspect may be used with another aspect to yield a still further aspect. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method, comprising:

receiving, by a cache management module at a compute node of a network, a first requested byte range of a network data resource from a first client device of the network, the first requested byte range being of a first data segment size;

determining, by the cache management module, that first data corresponding to the first requested byte range of the network data resource is not stored at a cache storage module of the network;

identifying, by the cache management module, a second data segment size for data stored at the cache storage module;

computing, by the cache management module, a second requested byte range of the network data resource that is an integer multiple of the second data segment size and that includes the entirety of the first requested byte range;

requesting, by the cache management module, the second requested byte range for the network data resource from a server of the network;

receiving, by the cache management module, second data from the server corresponding to the second requested byte range;

storing, by the cache management module, the second data at the cache storage module in one or more data segments at the cache storage module, each of the one or more data segments corresponding to the second data segment size;

sending, by the cache management module, third data from the cache storage module to the first client device, the third data corresponding to the first requested byte range and comprising data of the second data;

receiving, by the cache management module, a third requested byte range of the network data resource from the first client device, a third data segment size of the third requested byte range being less than the second data segment size;

identifying, by the cache management module, a first data segment at the cache storage module corresponding to the third requested byte range; and asserting, by the cache management module, a first cache lock for the third requested byte range, the first cache lock corresponding to a data range that is less than the entirety of the first data segment.

2. The method of claim 1, further comprising:

storing, by the cache management module, a header at the cache storage module that associates the one or more data segments stored at the cache storage module with the network data resource.

3. The method of claim 1, further comprising:

receiving, by the cache management module, a fourth requested byte range of the network data resource from the first client device, a fourth data segment size of the fourth requested byte range being less than the second data segment size;

identifying, by the cache management module, that data of the first data segment corresponds to the fourth requested byte range and that the fourth requested byte range is not identified by an asserted cache lock;

asserting, by the cache management module, a second cache lock for the fourth requested byte range; and retrieving, by the cache management module, data corresponding to the fourth requested byte range from the cache storage module while the first cache lock is asserted.

4. The method of claim 1, further comprising:

receiving, by the cache management module, a fourth requested byte range of the network data resource from the first client device, a fourth data segment size of the fourth requested byte range being less than the second data segment size;

identifying, by the cache management module, that data of the first data segment corresponds to the fourth requested byte range and that the fourth requested byte range is identified by an asserted cache lock; and blocking, by the cache management module, the request for the fourth requested byte range and subsequent requests for the fourth requested byte range from the first client device while the first cache lock is asserted.

5. The method of claim 1, further comprising:

receiving, by the cache management module, a fourth requested byte range of the network data resource from the first client device;

identifying, by the cache management module, a header data object stored at the cache storage module that is associated with the network data resource;

computing, by the cache management module, a data offset value relative to the header data object and corresponding to the fourth requested byte range; and sending, by the cache management module, fourth data from the cache storage module to the first client device, the fourth data corresponding to the fourth requested byte range.

6. The method of claim 5, further comprising:

receiving, by the cache management module, a request for the entirety of the network data resource from a second client device of the network;

identifying, by the cache management module, the header data object stored at the cache storage module that is associated with the network data resource; and sending, by the cache management module, fifth data from the cache storage module to the client device, the fifth data corresponding to the entirety of the network data resource.

7. The method of claim 1, further comprising:

receiving, by the cache management module, a fourth requested byte range of the network data resource from the first client device;

identifying, by a stream tracker module of the network, that the network data resource is being received as a data stream at the cache management module; and sending, by the cache management module, fourth data from the cache storage module to the first client device as the data stream is received at the cache management module, the fourth data corresponding to the fourth requested byte range.

8. The method of claim 1, further comprising:

receiving, by the cache management module, a fourth requested byte range of the network data resource from the first client device;

identifying, by a stream tracker module of the network, that the network data resource is not being received as a data stream at the cache management module;

requesting, by the stream tracker module, the fourth requested byte range for the network data resource from the server of the network;

receiving, by the stream tracker module, fourth data from the server of the network corresponding to the fourth requested byte range; and sending, by the stream tracker module, the fourth data to the cache management module.

9. A non-transitory computer-readable medium storing instructions for executing a computer-implemented method, the computer-implemented method comprising:

receiving, by a cache management module at a compute node of a network, a first requested byte range of a network data resource from a first client device of the network, the first requested byte range being of a first data segment size;

determining, by the cache management module, that first data corresponding to the first requested byte range of the network data resource is not stored at a cache storage module of the network;

identifying, by the cache management module, a second data segment size for data stored at the cache storage module;

computing, by the cache management module, a second requested byte range of the network data resource that is an integer multiple of the second data segment size and that includes the entirety of the first requested byte range;

requesting, by the cache management module, the second requested byte range for the network data resource from a server of the network;

receiving, by the cache management module, second data from the server corresponding to the second requested byte range;

storing, by the cache management module, the second data at the cache storage module in one or more data segments at the cache storage module, each of the one or more data segments corresponding to the second data segment size;

sending, by the cache management module, third data from the cache storage module to the first client device, the third data corresponding to the first requested byte range and comprising data of the second data;

receiving, by the cache management module, a third requested byte range of the network data resource from the first client device, a third data segment size of the third requested byte range being less than the second data segment size;

identifying, by the cache management module, a first data segment at the cache storage module corresponding to the third requested byte range; and asserting, by the cache management module, a first cache lock for the third requested byte range, the first cache lock corresponding to a data range that is less than the entirety of the first data segment.

10. The computer-implemented method of claim 9, further comprising:

storing, by the cache management module, a header at the cache storage module that associates the one or more data segments stored at the cache storage module with the network data resource.

11. The computer-implemented method of claim 9, further comprising:

receiving, by the cache management module, a fourth requested byte range of the network data resource from the first client device, a fourth data segment size of the fourth requested byte range being less than the second data segment size;

identifying, by the cache management module, that data of the first data segment corresponds to the fourth requested byte range and that the fourth requested byte range is not identified by an asserted cache lock;

asserting, by the cache management module, a second cache lock for the fourth requested byte range; and retrieving, by the cache management module, data corresponding to the fourth requested byte range from the cache storage module while the first cache lock is asserted.

12. The computer-implemented method of claim 9, further comprising:

receiving, by the cache management module, a fourth requested byte range of the network data resource from the first client device, a fourth data segment size of the fourth requested byte range being less than the second data segment size;

identifying, by the cache management module, that data of the first data segment corresponds to the fourth requested byte range and that the fourth requested byte range is identified by an asserted cache lock; and blocking, by the cache management module, the request for the fourth requested byte range and subsequent requests for the fourth requested byte range from the first client device while the first cache lock is asserted.

13. The computer-implemented method of claim 9, further comprising:

receiving, by the cache management module, a fourth requested byte range of the network data resource from the first client device;

identifying, by the cache management module, a header data object stored at the cache storage module that is associated with the network data resource;

computing, by the cache management module, a data offset value relative to the header data object and corresponding to the fourth requested byte range; and sending, by the cache management module, fourth data from the cache storage module to the first client device, the fourth data corresponding to the fourth requested byte range.

14. The computer-implemented method of claim 13, further comprising:

receiving, by the cache management module, a request for the entirety of the network data resource from a second client device of the network;

identifying, by the cache management module, the header data object stored at the cache storage module that is associated with the network data resource; and sending, by the cache management module, fifth data from the cache storage module to the client device, the fifth data corresponding to the entirety of the network data resource.

15. The computer-implemented method of claim 9, further comprising:

receiving, by the cache management module, a fourth requested byte range of the network data resource from the first client device;

identifying, by a stream tracker module of the network, that the network data resource is being received as a data stream at the cache management module; and sending, by the cache management module, fourth data from the cache storage module to the first client device as the data stream is received at the cache management module, the fourth data corresponding to the fourth requested byte range.

16. The computer-implemented method of claim 9, further comprising:

receiving, by the cache management module, a fourth requested byte range of the network data resource from the first client device;

identifying, by a stream tracker module of the network, that the network data resource is not being received as a data stream at the cache management module;

requesting, by the stream tracker module, the fourth requested byte range for the network data resource from the server of the network;

receiving, by the stream tracker module, fourth data from the server of the network corresponding to the fourth requested byte range; and sending, by the stream tracker module, the fourth data to the cache management module.

* * * * *